United States Patent
Takahashi

(10) Patent No.: US 8,716,919 B2
(45) Date of Patent: May 6, 2014

(54) DRIVE APPARATUS

(75) Inventor: Hiroshi Takahashi, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 349 days.

(21) Appl. No.: 13/189,665

(22) Filed: Jul. 25, 2011

(65) Prior Publication Data

US 2012/0025669 A1 Feb. 2, 2012

(30) Foreign Application Priority Data

Jul. 30, 2010 (JP) .................................. 2010-172430

(51) Int. Cl.
H02N 2/12 (2006.01)

(52) U.S. Cl.
USPC .................. 310/328; 310/323.02; 310/323.09

(58) Field of Classification Search
USPC ............................... 310/323.01–323.19, 328
See application file for complete search history.

(56) References Cited

U.S. PATENT DOCUMENTS

| | | | | |
|---|---|---|---|---|
| 4,947,077 A * | 8/1990 | Murata | ........................ | 310/328 |
| 5,134,335 A * | 7/1992 | Ikemoto et al. | ............... | 310/328 |
| 5,399,930 A * | 3/1995 | Culp | ............................ | 310/328 |
| 2004/0074300 A1 * | 4/2004 | Karrai et al. | ............... | 73/514.34 |
| 2004/0195939 A1 * | 10/2004 | Noda | ............................ | 310/328 |
| 2005/0285479 A1 * | 12/2005 | Machida | ....................... | 310/328 |
| 2009/0277300 A1 * | 11/2009 | Matsuki | ....................... | 74/99 R |

FOREIGN PATENT DOCUMENTS

| | | |
|---|---|---|
| JP | 63-299785 | 7/1988 |
| JP | 05-151580 | 6/1993 |
| JP | 07-194154 | 7/1995 |
| JP | 2002-305896 | 10/2002 |
| JP | 2005-256954 | 9/2005 |

OTHER PUBLICATIONS

Ikuta, Koji, et al., "Hyper Redundant Active Endoscope for Minimally Invasive Surgery", Journal of the Robotics Society of Japan, 1998, vol. 16, No. 4, pp. 145-151.
Japanese Office Action mailed Jun. 19, 2012 for Japanese Application No. 2010-172430.

* cited by examiner

*Primary Examiner* — Thomas Dougherty
(74) *Attorney, Agent, or Firm* — Amin, Turocy & Watson, LLP

(57) ABSTRACT

A drive apparatus according to an embodiment includes: a movable unit configured to include a first sliding surface, and slide along the first sliding surface; a vibration generating unit configured to generate vibrations; a vibration transmitting unit configured to include a second sliding surface in contact with the first sliding surface of the movable unit, and transmit the vibrations generated by the vibration generating unit to the movable unit via the first and second sliding surfaces; a pre-pressure applying unit configured to apply pre-pressure to the movable unit via the vibration transmitting unit; and a driving force generating unit configure to generate a driving force for driving the movable unit in a predetermined direction, the driving force being greater than a friction force between the first sliding surface and the second sliding surface when the vibrations are being transmitted to the vibration transmitting unit, the driving force being smaller than the friction force when the vibrations are not being transmitted to the vibration transmitting unit.

10 Claims, 12 Drawing Sheets

DRIVE APPARATUS

CROSS-REFERENCE TO RELATED APPLICATION

This application is based upon and claims the benefit of priority from prior Japanese Patent Application No. 2010-172430 filed on Jul. 30, 2010 in Japan, the entire contents of which are incorporated herein by reference.

FIELD

Embodiments described herein relate generally to a drive apparatus that has frictional sliding surfaces, and controls friction forces acting on the sliding surface through high-frequency microvibrations.

BACKGROUND

Since frictions in a support mechanism for a precise positioning table have great influence on the mobility capability, a drive apparatus that minimizes friction forces in the supporting mechanism is normally used.

Meanwhile, there has been a minute moving device that actively utilizes frictions acting on frictional sliding surfaces and can perform precise positioning of submicron order, though the moving device has a small-sized, simple mechanism. This moving device is a minute moving device that takes advantage of electromagnetic repulsion forces and rapid deformation of piezoelectric elements, and has a so-called "impact mechanism." The impact mechanism has a small-sized, simple structure and is capable of making minute step movements. In view of this advantage, precise positioning tables, micromanipulators, and the like have been suggested.

Further, various applications have already been suggested by taking advantage of the phenomenon that friction forces become smaller through generation of high-frequency microvibrations, and such a phenomenon is also utilized in some positioning devices. For example, drive apparatuses that take advantage of a friction reducing effect by using ultrasonic vibrations have been known.

However, a today's precise positioning table is required not only to achieve a simple objective such as higher precision or higher speed, but also to achieve higher speed, higher stabilizability, higher stability, and more precise positioning in a single drive apparatus, and to realize each of the objectives at even higher levels.

As mentioned above, a drive system that minimizes friction forces in the supporting mechanism unit is often used. Most of such drive systems are designed to use hydrostatic air bearings. Such drive systems exhibit excellent characteristics in precise positioning, but do not satisfy the requirements in terms of speed, stabilizability, and stability. Further, such drive apparatuses are large in size, and are expensive.

Having a small-sized, simple structure, an impact mechanism is a small-sized device and is inexpensive. With the use of an impact mechanism, it is possible to produce a precise positioning system having an extremely high precision. Such an impact mechanism also exhibits excellent characteristics in stabilizability and stability. However, because of its drive principles, an impact mechanism makes minute step movements, and therefore, is not satisfactory in terms of speed.

By reducing frictions in the bearing mechanism with the use of ultrasonic vibrations, excellent precise positioning is performed by taking advantage of a friction reducing effect, and high stabilizability and high stability are achieved by taking advantage of a frictional sliding effect. However, no specific measures have been suggested to improve the speed that is adversely affected by the frictional sliding effect. Therefore, there has been demand for development of specific structures and drive methods to solve the problem.

DETAILED DESCRIPTION

Figure 1:
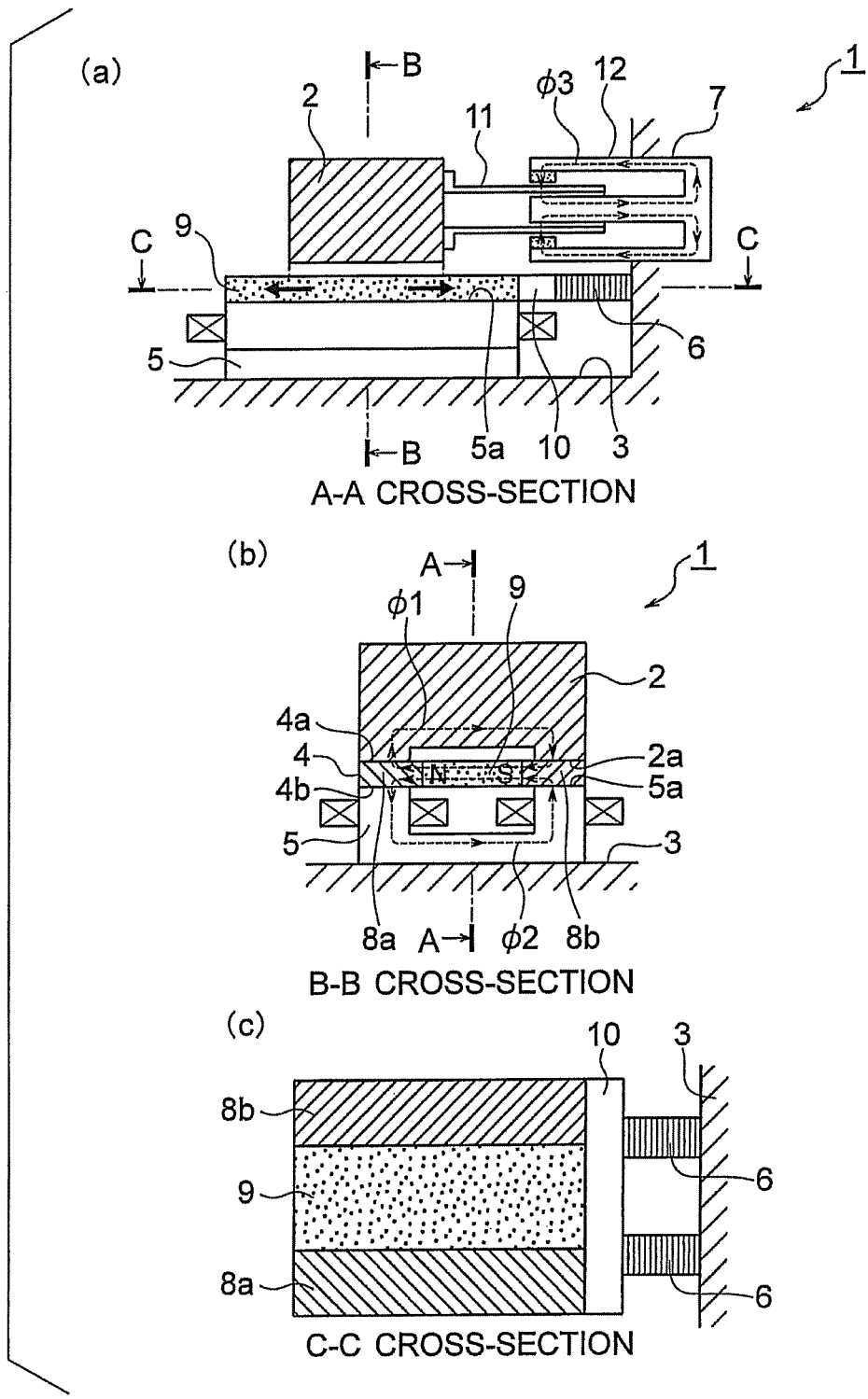
FIGS. 1(a), 1(b), and 1(c) are cross-sectional views showing a drive apparatus according to a first embodiment.

The following is a description of embodiments, with reference to the accompanying drawings.

A drive apparatus according to an embodiment includes: a movable unit configured to include a first sliding surface, and slide along the first sliding surface; a vibration generating unit configured to generate vibrations; a vibration transmitting unit configured to include a second sliding surface in contact with the first sliding surface of the movable unit, and transmit the vibrations generated by the vibration generating unit to the movable unit via the first and second sliding surfaces; a pre-pressure applying unit configured to apply pre-pressure to the movable unit via the vibration transmitting unit; and a driving force generating unit configure to generate a driving force for driving the movable unit in a predetermined direction, the driving force being greater than a friction force between the first sliding surface and the second sliding surface when the vibrations are being transmitted to the vibration transmitting unit, the driving force being smaller than the friction force when the vibrations are not being transmitted to the vibration transmitting unit.

First Embodiment

FIGS. 1(a), 1(b), and 1(c) show a drive apparatus according to a first embodiment. FIG. 1(a) is a cross-sectional view of the drive apparatus, taken along the line A-A of FIG. 1(b). FIG. 1(b) is a cross-sectional view of the drive apparatus, taken along the line B-B of FIG. 1(a). FIG. 1(c) is a cross-sectional view of the drive apparatus, taken along the line C-C of FIG. 1(a).

The drive apparatus 1 of this embodiment includes: a movable unit 2 that is mounted on a stationary base 3 and can move in a direct-acting manner with respect to the horizontal direction of FIG. 1(a); a vibration transmitting unit 4 that has vibrational sliding surfaces 4a that are in contact with and slide along sliding surfaces 2a of the movable unit 2, and transmits vibrations; an electromagnet 5 that applies pre-pressure to the movable unit 2 via the vibration transmitting unit 4; piezoelectric elements 6 that are connected to the vibration transmitting unit 4 via a connecting member 10 and that transmits vibrations to the vibration transmitting unit; and a linear motor 7 that generates a thrust force for moving the movable unit 2 along the vibrational sliding surfaces 4a. The vibration transmitting unit 4 also includes vibrational sliding surfaces 4b that are in contact with and slide along sliding surfaces 5a of the electromagnet 5. The vibration transmitting unit 4 further includes: vibrating yoke portions 8a and 8b that define magnetic paths magnetically connecting the movable unit 2 and the electromagnet 5 via the vibrational sliding surfaces 4a and 4b; and a permanent magnet 9 that is positioned between the vibrating yoke portions 8a and 8b, and is magnetized along the vibrating yoke portions 8a and 8b. In this embodiment, the movable unit 2 slides on the vibrating yoke portions 8a and 8b, but does not slide on the permanent magnet 9. That is, a hollow is provided between the movable unit 2 and the permanent magnet 9.

One end of each of the vibrating yoke portions 8a and 8b and the permanent magnet 9 is connected to the piezoelectric elements 6 via the connecting member 10 made of a nonmagnetic material, and the other end of each of the piezoelectric elements 6 are secured to the stationary base 3. In this embodiment, there are two piezoelectric elements 6, as shown in FIG. 1(c). However, the present invention is not limited to this, and the number of piezoelectric elements 6 may be one, or may be three or more. The piezoelectric elements 6 whose number, shape, and size are suitable for generating vibrations can be used. It should be noted that the movable unit 2 includes a magnetic yoke portion (not shown) that faces the vibration transmitting unit 4.

A magnetic flux $\phi 1$ generated from the permanent magnet 9 defines a closed loop having the magnetic path extending from the permanent magnet 9 to the vibrating yoke portion 8a to the magnetic yoke portion (not shown) of the movable unit 2 to the vibrating yoke portion 8b to the permanent magnet 9. With this arrangement, a magnetic attractive force is generated between the movable unit 2 and the vibration transmitting unit 4, and pre-pressure is applied from the vibration transmitting unit 4 to the movable unit 2. Likewise, a magnetic flux $\phi 2$ generated from the permanent magnet 9 defines a closed loop having the magnetic path extending from the permanent magnet 9 to the vibrating yoke portion 8a to the yoke of the electromagnet 5 to the vibrating yoke portion 8b to the permanent magnet 9. With this arrangement, a magnetic attractive force is generated between the electromagnet 5 and the vibration transmitting unit 4, and pre-pressure is applied from the electromagnet 5 to the vibration transmitting unit 4. In the permanent magnet 9 shown in FIG. 1(b), the left end is the N-pole, and the right end is the S-pole. However, the present invention is not limited to that, and the locations of the poles may be reversed.

The movable unit 2 further includes a movable element 11 for the linear motor 6 that generates a thrust force (a driving force) in a direction substantially parallel to the vibrational sliding surfaces 4a, and a stationary member 12 of the linear motor 7 that is paired with the movable element 11 is mounted on the stationary base 3. That is, the linear motor 7 drives the movable unit 2 in a direction substantially parallel to the vibrational sliding surfaces 4a. The linear motor 7 may be of a known type, and is not particularly limited to a certain type. For example, a voice coil motor (VCM) can be used. That is, the movable element 11 forms an air-core coil, and the stationary member 12 forms a magnetic circuit. A thrust force is obtained by magnetic fluxes $\phi 3$ generated by the stationary member 12 and an excitation current of the air-core coil, according to the Fleming's left-hand rule. A VCM has a thrust force proportional to the excitation current, and therefore, has excellent characteristics in terms of operability and controllability. The thrust force is stable, regardless of the position of generation of the thrust force. Also, the thrust force is continuously generated. Accordingly, a VCM is suitable as a means to provide a certain thrust force in the drive apparatus of this embodiment.

Figure 2:
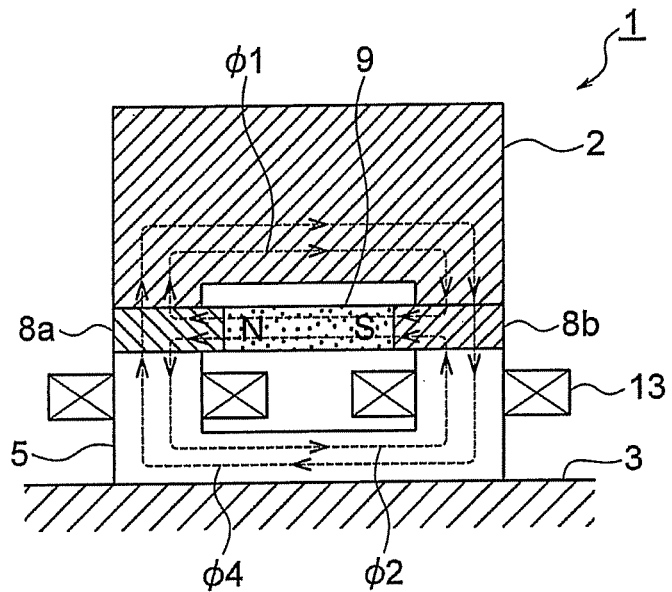
FIG. 2 is a diagram for explaining a function of the electromagnet according to the first embodiment.
Figure 3:
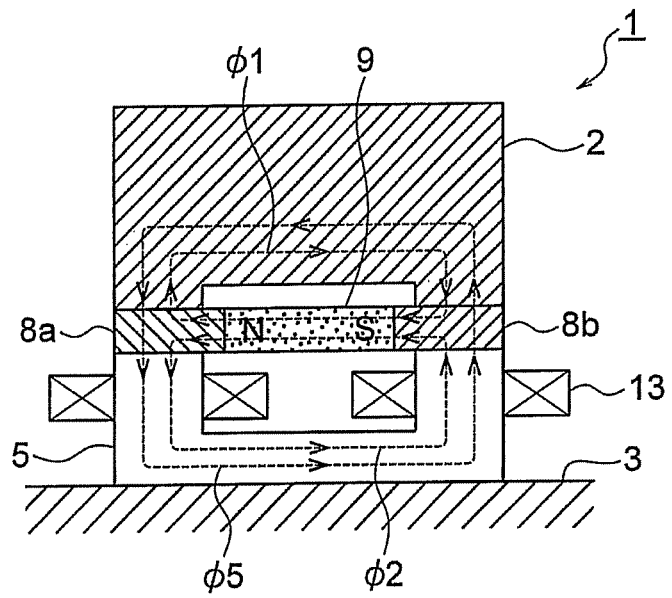
FIG. 3 is a diagram for explaining another function of the electromagnet according to the first embodiment.

Referring now to FIGS. 2 and 3, the functions of the electromagnet 5 in the drive apparatus 1 according to this embodiment are described. FIGS. 2 and 3 are cross-sectional views of the drive apparatus 1 of this embodiment, taken along the line B-B of FIG. 1(a).

The electromagnet 5 is a horseshoe-shaped electromagnet that includes control coils 13, for example. When a current is applied to the control coils 13 by an electromagnet driver (not shown), a magnetic flux $\phi 4$ or a magnetic flux $\phi 5$ is generated in the electromagnet 5, depending on the direction of the current flow. The magnetic flux $\phi 4$ shown in FIG. 2 defines a closed loop having the magnetic path extending from the electromagnet yoke to the vibrating yoke portion 8a to the magnetic yoke portion (not shown) of the movable unit 2 to the vibrating yoke portion 8b to the electromagnet yoke. The magnetic flux $\phi 4$ generates a magnetic attractive force between the movable unit 2 and the vibration transmitting unit 4, and also generates a magnetic attractive force between the electromagnet 5 and the vibration transmitting unit 4. With this arrangement, pre-pressure is applied between the respective components. Overlapping the magnetic flux $\phi 1$ and the magnetic flux $\phi 2$ of the permanent magnet 9, the magnetic flux $\phi 4$ is subjected to the following action. The pre-pressure between the sliding surfaces 2a of the movable unit 2 and the vibrational sliding surfaces 4a (hereinafter referred to as the second pre-pressure) acts in a direction in which the magnetic flux $\phi 1$ and the magnetic flux $\phi 4$ strengthen each other. Accordingly, the second pre-pressure is higher than the pre-pressure generated by the magnetic flux $\phi 1$ of the permanent magnet 9.

Meanwhile, the pre-pressure between the sliding surfaces 5a of the electromagnet 5 and the vibrational sliding surfaces 4b (hereinafter referred to as the first pre-pressure) acts in a direction in which the magnetic flux $\phi 2$ and the magnetic flux $\phi 4$ weaken (cancel) each other. Accordingly, the first pre-pressure is lower than the pre-pressure generated by the magnetic flux $\phi 2$ of the permanent magnet 9.

The magnetic flux $\phi 5$ shown in FIG. 3 is in the opposite direction from the magnetic flux $\phi 4$, and is obtained by switching the excitation current for the control coils 13 of the electromagnet 5 between positive and negative directions. The magnetic flux $\phi 5$ defines a closed loop having the magnetic path extending from the electromagnet yoke to the vibrating yoke portion 8b to the magnetic yoke portion (not shown) of the movable unit 2 to the vibrating yoke portion 8a to the electromagnet yoke. The magnetic flux $\phi 5$ generates the first pre-pressure and the second pre-pressure. Here, the second pre-pressure acts in a direction in which the magnetic flux φ1 and the magnetic flux φ5 weaken (cancel) each other, and therefore, the second pre-pressure is lower than the pre-pressure generated by the magnetic flux φ1 of the permanent magnet 9.

On the other hand, the first pre-pressure acts in a direction in which the magnetic flux φ2 and the magnetic flux φ5 strengthen each other, and therefore, the first pre-pressure is higher than the pre-pressure generated by the magnetic flux φ2 of the permanent magnet 9. In view of the above-described facts, the first and second pre-pressures can be actively and continuously adjusted by adjusting the excitation current for the control coils 13 of the electromagnet 5.

Figure 4:
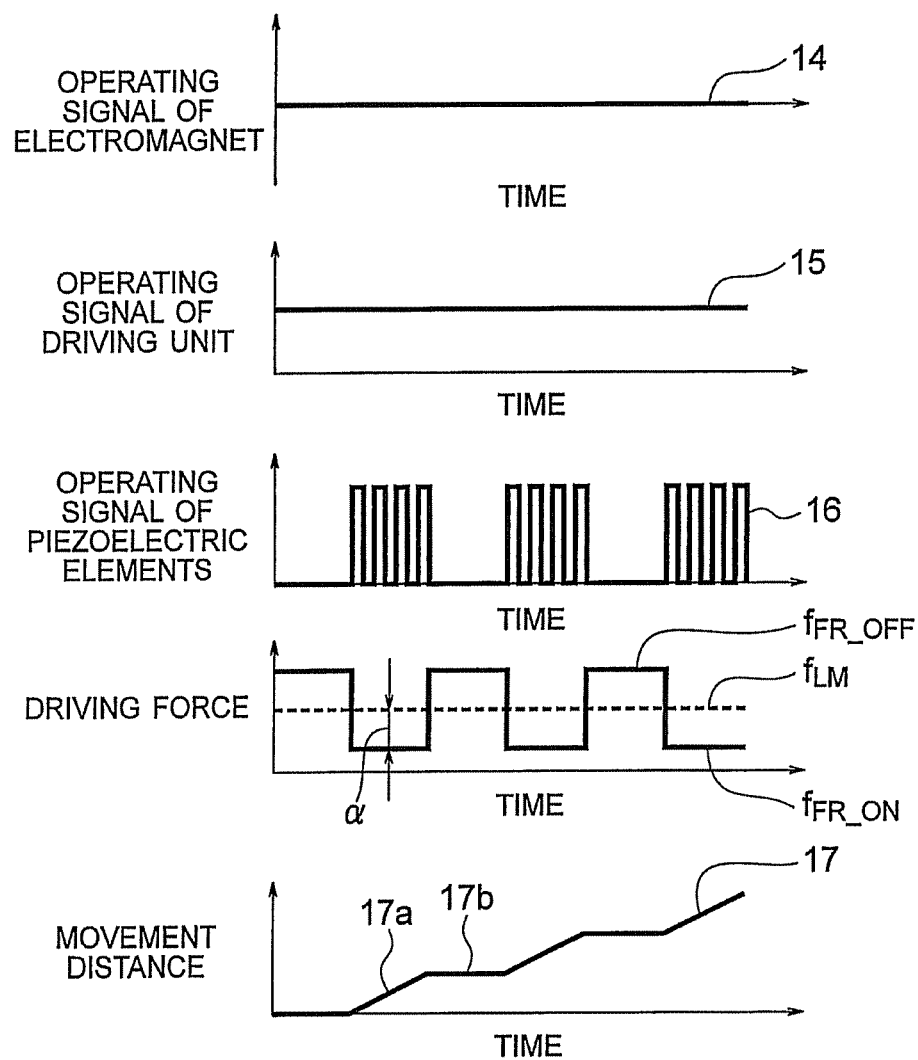
FIG. 4 is a timing chart showing a first specific example of an operation according to the first embodiment.

Referring now to FIG. 4, a first specific example of an operation of the drive apparatus 1 according to this embodiment is described. FIG. 4 shows timing charts of the operating signals of respective parts, the driving force, and the movement distance. The operating signal 14 of the excitation current for the control coils 13 of the electromagnet 5 is set at zero, and the first pre-pressure and the second pre-pressure are generated by virtue of the magnetic attractive forces generated by the magnetic flux φ1 and the magnetic flux φ2 of the permanent magnet 9. Here, it is preferable to set the first pre-pressure and the second pre-pressure at substantially the same values. An operating signal 16 for causing vibration displacement in the piezoelectric elements 6 is input to the piezoelectric driver (not shown) that actuates the piezoelectric elements 6, and vibrations are transmitted to the vibration transmitting unit 4. The operating signal 15 of the linear motor 7 is adjusted so that a thrust force (a driving force) $f_{LM}$ to be applied to the movable unit 2 becomes greater than a friction force $f_{FR\_ON}$ acting on the sliding surfaces 2a of the movable unit 2 when the piezoelectric elements 6 are actuated and vibrations are being transmitted to the vibration transmitting unit 4, and the thrust force $f_{LM}$ becomes smaller than a friction force $f_{RF\_OFF}$ acting on the sliding surfaces 2a of the movable unit 2 when vibrations are not being transmitted to the vibration transmitting unit 4. With this arrangement, when vibrations are being transmitted to the vibration transmitting unit 4 or when the piezoelectric elements 6 are operating and vibrating, α ($=f_{LM}-f_{FR\_ON}>0$) shown in FIG. 4 serves as the net driving force and drives the movable unit 2. When vibrations are not being transmitted to the vibration transmitting unit 4 or when the piezoelectric elements 6 are not operating, the movable unit 2 is put into a stopped state.

The operating signal 16 is periodically varied so that the piezoelectric elements 6 enter an intermittent operation mode, repeatedly vibrating (ON) and stopping (OFF). In this manner, the movable unit 2 can realize intermittent driving 17, being repeatedly switched between a moving state 17a and a stopped state 17b.

As described above, the respective actions of the moving 17a and the stopping 17b of the movable unit 2 are controlled through the piezoelectric elements 6. Accordingly, high-speed intermittent driving in short intermittent cycles can be realized by taking advantage of the high response speed of the piezoelectric elements 6.

Furthermore, the respective actions of the moving 17a and the stopping 17b of the movable unit 2 are realized through variations in the friction force acting on the sliding surfaces 2a. Accordingly, the movable unit 2 can passively obtain a large damping effect through frictions. Thus, stabilizability of stopping operations and stability in the stopped state are expected to increase. Unlike conventional structures that cause damping through control systems, this specific example does not require a sensor and a control circuit. Accordingly, the size of the drive apparatus can be reduced. Thus, high-speed, short-cycle intermittent driving can be readily realized with an open-loop control system, though the drive apparatus is a simple equipment system.

Figure 5:
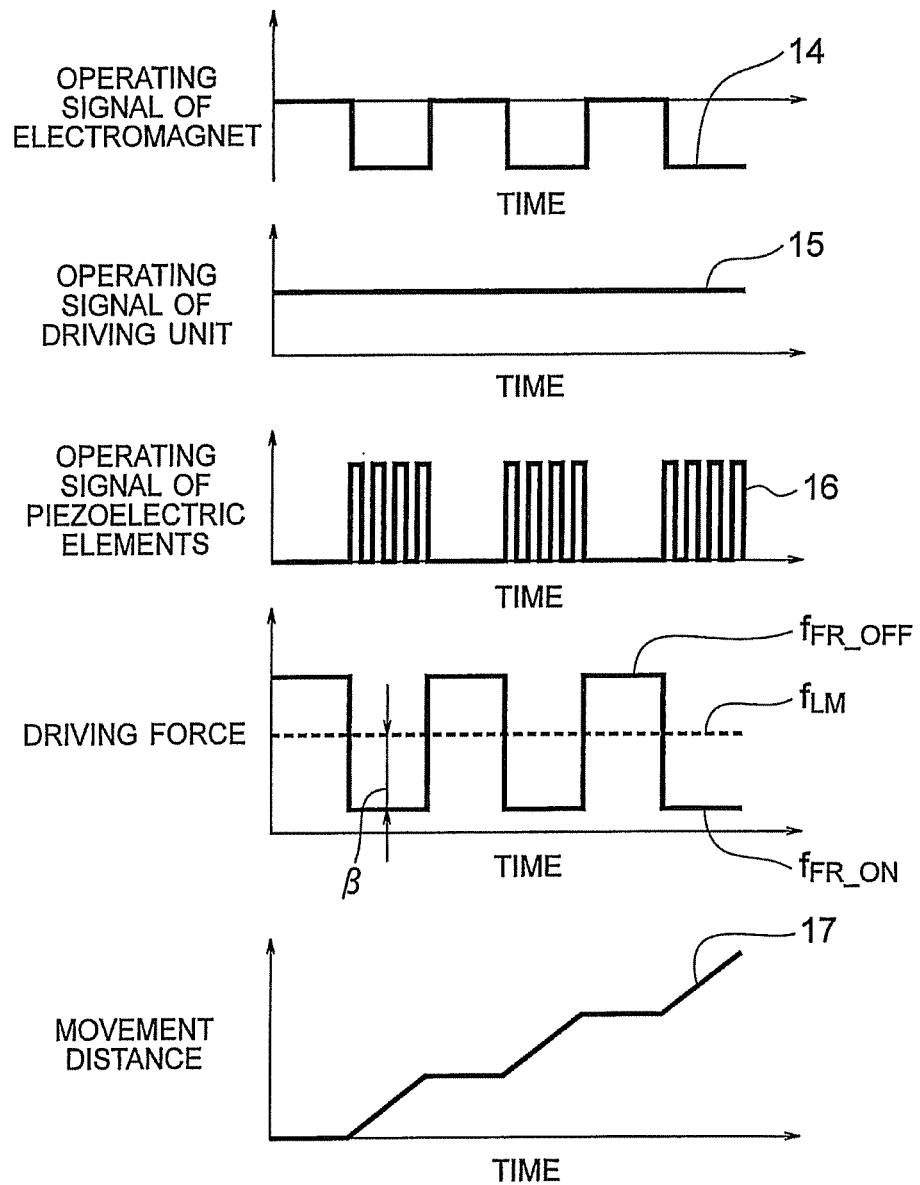
FIG. 5 is a timing chart showing a second specific example of an operation according to the first embodiment.

Referring now to FIG. 5, a second specific example of an operation of the drive apparatus 1 according to this embodiment is described. In the operation of the second specific example, the operating signal 14 of the electromagnet 5 is periodically varied in synchronization with the operating signal 16 of the piezoelectric elements 6, as shown in FIG. 5. That is, when the piezoelectric elements 6 are operating and vibrations are being transmitted to the vibration transmitting unit 4, the operating signal 14 of the electromagnet 5 is switched to a negative value, and the magnetic flux φ5 shown in FIG. 3 is generated. Since the second pre-pressure acts in the direction in which the magnetic flux φ1 and the magnetic flux φ5 weaken (cancel) each other, the friction force $f_{FR\_ON}$ acting on the sliding surfaces 2a of the movable unit 2 further decreases, and a larger net driving force β ($=f_{LM}-f_{FR\_ON}>0$) than the net driving force α shown in FIG. 4 can be obtained. As a result, the movable unit 2 can be expected to operate at a higher speed.

Figure 6:
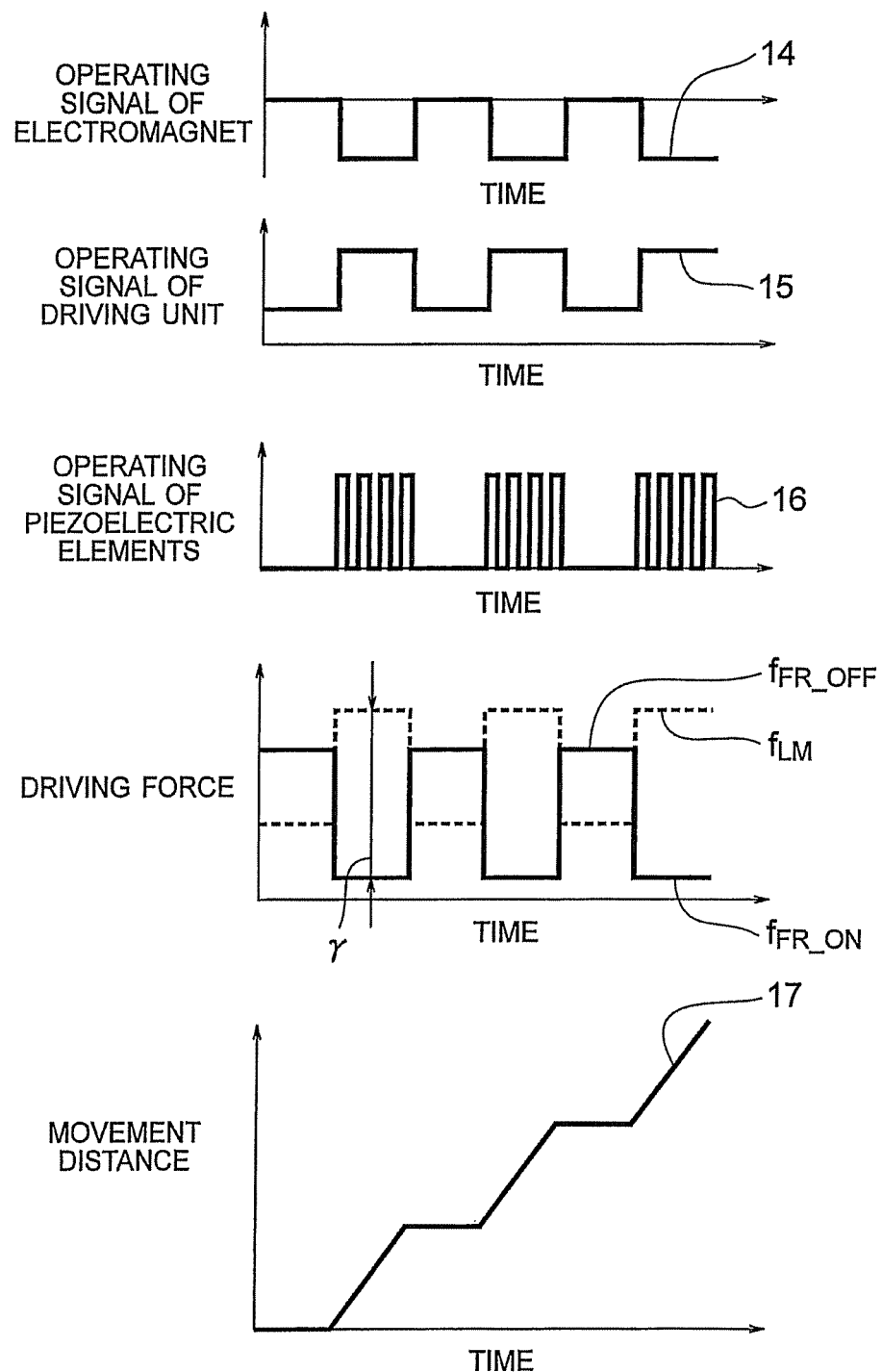
FIG. 6 is a timing chart showing a third specific example of an operation according to the first embodiment.

Referring now to FIG. 6, a third specific example of an operation of the drive apparatus 1 according to this embodiment is described. In the operation of the third specific example, the operating signal 15 of the linear motor 7 is periodically varied in synchronization with the operating signal 16 of the piezoelectric elements 6 and the operating signal 14 of the electromagnet 5, as shown in FIG. 6. That is, when the piezoelectric elements 6 are operating and vibrations are being transmitted to the vibration transmitting unit 4, the operating signal 15 of the linear motor 7 is made larger to increase the thrust force $f_{LM}$. When vibrations are not being transmitted to the vibration transmitting unit 4, the operating signal 15 of the linear motor 7 is made smaller to decrease the thrust force $f_{LM}$. In this manner, a larger net driving force γ ($=f_{LM}-f_{FR\_ON}>0$) than the net driving force β shown in FIG. 5 can be obtained. As a result, the movable unit 2 can be expected to operate at an even higher speed.

As described above, this embodiment can provide a drive apparatus that can be made smaller in size, while achieving higher speed, higher stabilizability, higher stability, and more precise positioning.

FIGS. 1 through 3 show the sliding surfaces 2a of the movable unit 2, the vibrational sliding surfaces 4a and 4b, and the sliding surfaces 5a of the electromagnet 5 as flat surfaces. However, the present invention is not limited to that, and modified structures may be used, as long as those surfaces have the above described functions. For example, the above respective sliding surfaces may form V-like shapes in a plane perpendicular to the direction of movement of the movable unit 2. Such modifications will be described below, with reference to FIGS. 7 and 8.

First Modification

Figure 7:
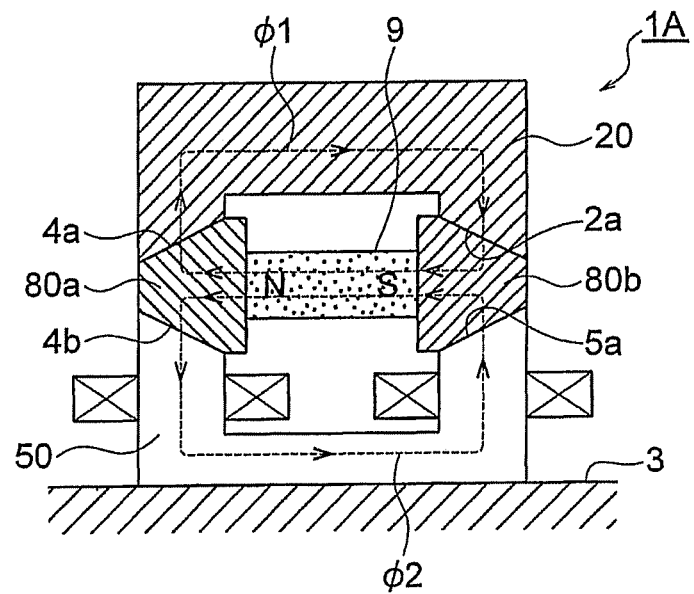
FIG. 7 is a cross-sectional view showing a drive apparatus according to a first modification of the first embodiment.

FIG. 7 is a cross-sectional view showing a first modification of the drive apparatus according to the first embodiment. The drive apparatus 1A of the first embodiment differs from the drive apparatus 1 of the first embodiment in that the movable unit 2, the vibrating yoke portions 8a and 8b, and the electromagnet 5 are replaced with a movable unit 20, vibrating yoke portions 80a and 80b, and an electromagnet 50.

In the drive apparatus 1 according to the first embodiment, the sliding surfaces 2a of the movable unit 2, the vibrational sliding surfaces 4a and 4b, and the sliding surfaces 5a of the electromagnet 5 are arranged on substantially straight lines in a plane perpendicular to the direction of movement of the movable unit 2 (see FIG. 1(b)). That is, the sliding surfaces 2a of the movable unit 2, the vibrational sliding surfaces 4a and 4b, and the sliding surfaces 5a of the electromagnet 5 are arranged parallel to a plane substantially perpendicular to the direction of movement of the movable unit 2 and the vertical direction.

In the drive apparatus 1A according to the first modification, on the other hand, the sliding surfaces 2a, 4a, 4b, and 5a form V-like shapes. That is, the sliding surfaces 2a of the movable unit 20, the vibrational sliding surfaces 4a and 4b, and the sliding surfaces 5a of the electromagnet 50 are tilted with respect to a plane substantially perpendicular to the direction of movement of the movable unit 20 and the vertical direction. In other words, the vibrational sliding surfaces 4a and 4b are at an angle larger than 180 degrees or smaller than 180 degrees with respect to the vibrating yoke portions 80a and 80b of the drive apparatus 1A. The sliding surfaces 2a of the movable unit 20 are designed to have such shapes as to be in contact with and slide along the vibrational sliding surfaces 4a, and the sliding surfaces 5a of the electromagnet 50 are designed to have such shapes as to be in contact with and slide along the vibrational sliding surfaces 4b.

In the structure of the drive apparatus 1 of the first embodiment, the movable unit 2 can freely move in the plane of the vibrational sliding surfaces 4a. Therefore, where there is a need to perform precise positioning, a guide mechanism (not shown) might be required to restrict the degree of freedom in the directions other than the driving direction. In the drive apparatus 1A according to the first modification, however, the degree of freedom can be restricted in the directions other than the driving direction, without a guide mechanism as an external device. In this manner, the need of a guide mechanism as an external device is eliminated. Accordingly, the drive apparatus can be made even smaller in size, and precise positioning can be realized.

Second Modification

Figure 8:
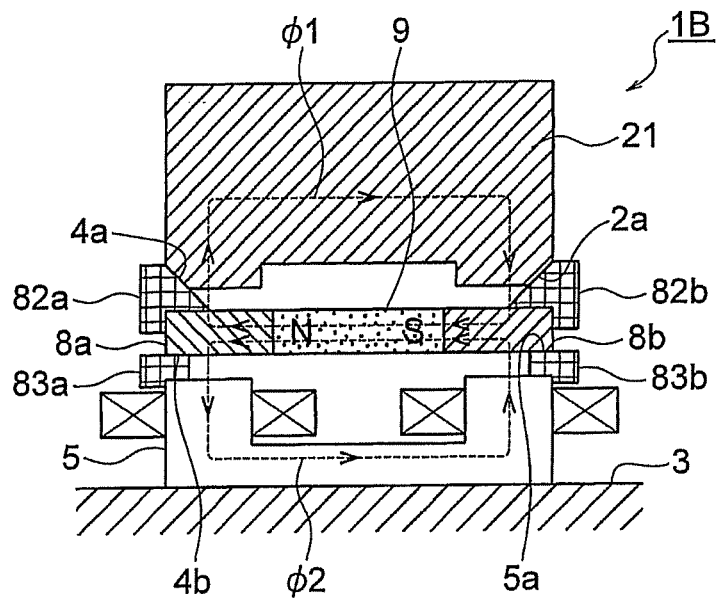
FIG. 8 is a cross-sectional view showing a drive apparatus according to a second modification of the first embodiment.

FIG. 8 is a cross-sectional view showing a second modification of the drive apparatus according to the first embodiment. The drive apparatus 1B of the second modification differs from the drive apparatus 1 of the first embodiment in that the movable unit 2 is replaced with a movable unit 21, and sliding members 82a, 82b, 83a, and 83b are added.

The sliding members 82a and 82b are fixed to the vibrating yoke portions 8a and 8b. The vibrational sliding surfaces 4a that are in contact with and slide along the sliding surfaces 2a of the movable unit 21 are formed on the sliding members 82a and 82b. The sliding members 83a and 83b are fixed to the electromagnet 5. Sliding faces 5a that are in contact with and slide along the vibrational sliding surfaces 4b are formed on the sliding members 83a and 83b. Further, the sliding surfaces 2a and 4a form a V-like shape in a plane perpendicular to the direction of movement of the movable unit 21.

The electromagnet 5, the vibration transmitting unit 4, and the movable unit 21 are integrally connected by the magnetic attractive forces generated by the magnetic fluxes $\phi 1$ and $\phi 2$ of the permanent magnet 9 via the sliding members 82a, 82b, 83a, and 83b. Accordingly, a predetermined space is formed between the vibrating yoke portions 8a and 8b and the movable unit 21, and another predetermined space is formed between the vibrating yoke portions 8a and 8b and the electromagnet 5. Accordingly, there is no mechanical sliding between the respective magnetic pole parts.

In the drive apparatuses 1 and 1A of the first embodiment and the first modification, the magnetic pole surfaces of each part is used as the sliding surface. However, the magnetic pole material (including the surface treatment material) of the electromagnet 5 and the like is not always compatible with the material (including the sliding plate and its surface treatment material) of each sliding surface in an optimum manner. Particularly, where a long service life and precise positioning are strongly required, the degree of freedom in design is not sufficient, and satisfactory performance might not be achieved.

In the structure of the drive apparatus 1B of the second modification, on the other hand, the magnetic pole material (including the surface treatment material) of the electromagnet 5 and the like can be designed independently of the materials (the sliding members 82a, 82b, 83a, and 83b) of the sliding surfaces. Accordingly, the degree of freedom in design becomes higher, and the drive apparatus can be optimized. In the second modification, the sliding members 82a and 82b are fixed to the sliding yoke portions 8a and 8b, and the sliding members 83a and 83b are fixed to the electromagnet 5. However, the present invention is not limited to that arrangement. For example, the sliding members 82a and 82b may be fixed to the movable unit 21, and the sliding members 83a and 83b may be fixed to the vibrating yoke portions 8a and 8b. Although the sliding surfaces 2a and 4a form a V-like shape in a plane perpendicular to the direction of movement of the movable unit 21, the sliding surfaces 2a and 4a may be substantially parallel to one other. Although the sliding surfaces 4b and 5a are substantially parallel to one another in a plane perpendicular to the direction of movement of the movable unit 21, the sliding surfaces 4b and 5a may form a V-like shape.

In FIGS. 4 through 6, the operating signal 16 of the piezoelectric elements 6 is shown as a square wave. However, the operating signal 16 is not limited to that, and may be a sine wave, a triangular wave, a sawtooth wave, or a wave having a waveform selected by a user. The frequency and the amplitude are determined from the specification of the piezoelectric elements 6, the mechanical characteristics of the mechanical structure, and the specification of the piezoelectric driver. However, the frequency should preferably be set in an ultrasonic range, in view of generation of abnormal noise. When the piezoelectric elements 6 are of a stacked-layer type, an offset value is set as needed, and an operating signal is formed only from positive signals. Further, the intermittent operation repeatedly vibrating (ON) and stopping (OFF) the piezoelectric elements 6 has been described as an operation with a duty ratio of 50%. However, the present invention is not limited to that, and the duty ratio may have any value.

Second Embodiment

Figure 9:
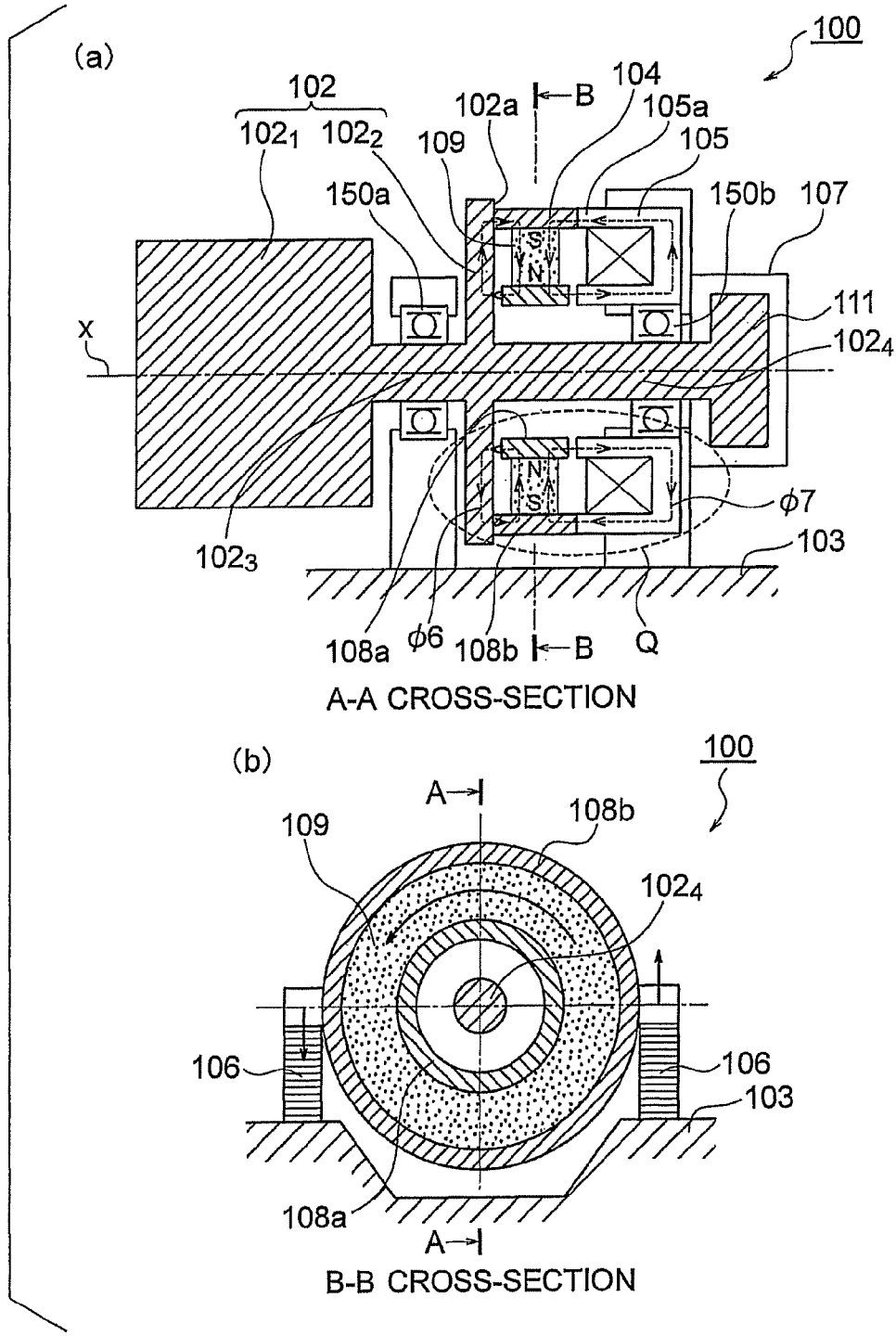
FIGS. 9(a) and 9(b) are cross-sectional views showing a drive apparatus according to a second embodiment.
Figure 10:
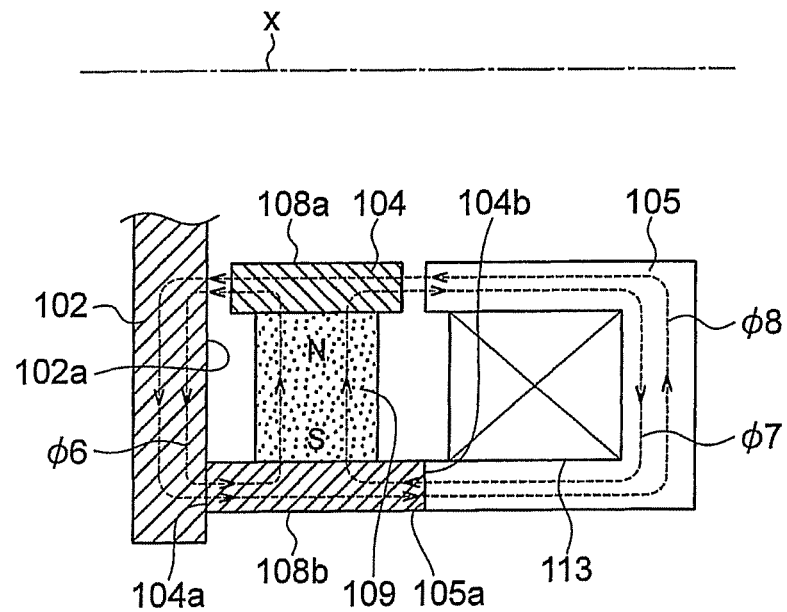
FIG. 10 is a diagram for explaining a function of the electromagnet according to the second embodiment.
Figure 11:
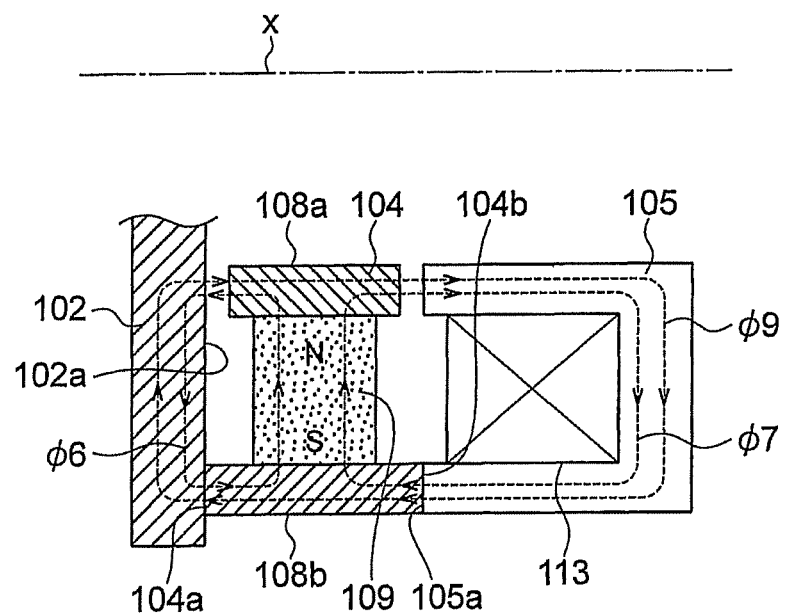
FIG. 11 is a diagram for explaining another function of the electromagnet according to the second embodiment.

Referring now to FIGS. 9(a), 9(b), 10, and 11, a drive apparatus according to a second embodiment is described. FIG. 9(a) is a cross-sectional view of the drive apparatus, taken along the line A-A of FIG. 9(b). FIG. 9(b) is a cross-sectional view of the drive apparatus, taken along the line B-B of FIG. 9(a). FIGS. 10 and 11 are partially enlarged views of the portion Q indicated by the broke line in FIG. 9(a), and are diagrams for explaining the functions of an electromagnet according to the second embodiment.

The drive apparatus 100 according to the second embodiment includes: a movable unit 102 that rotatably moves about the x-axis (the axis of rotation) and includes a main body $102_1$ and a sliding portion $102_2$; bearings 150a and 150b that are mounted on a stationary base 103 and rotatably support the movable unit 102; a vibration transmitting unit 104 that includes a vibrational sliding surface 104a that is in contact with and slides along a sliding surface 102a of the movable unit 102; an electromagnet 105 that applies pre-pressure to the sliding portion $102_2$ of the movable unit 102 via the vibration transmitting unit 104; piezoelectric elements 106 that are connected to the vibration transmitting unit 104 and transmit vibrations to the vibration transmitting unit 104; and a rotary motor 107 that generates a torque for moving the movable unit 102 about the x-axis. The main body $102_1$ and the sliding portion $102_2$ are connected by a first connecting portion $102_3$ located between the main body $102_1$ and the sliding portion $102_2$, and rotates integrally with the main body $102_1$ and the sliding portion $102_2$. The sliding portion $102_2$ and a movable element 111 of the rotary motor 107 are connected by a second connecting portion $102_4$ located between the sliding portion $102_2$ and the movable element 111 of the rotary motor 107, and rotate integrally with the sliding portion $102_2$ and the movable element 111. The movable unit 102 is rotatably supported by the bearing 150a at the first connecting portion $102_3$, and is rotatably supported by the bearing 150b at the second connecting portion $102_4$.

The vibration transmitting unit 104 also includes a vibrational sliding surface 104b that is in contact with and slides along a sliding surface 105a of the electromagnet 105. The vibration transmitting unit 104 further includes: ring-like vibrating yoke portions 108a and 108b that define magnetic paths magnetically connecting the movable unit 102 and the electromagnet 105 via the vibrational sliding surfaces 104a and 104b; and a ring-like permanent magnet 109 that is magnetized in the radial direction so that the vibrating yoke portion 108a is placed on the inner peripheral surface, and the vibrating yoke portion 108b is placed on the outer peripheral surface. In this embodiment, the vibration transmitting unit 104 is designed to slide together with the sliding portion $102_2$ of the movable unit 102 and the electromagnet 105 by virtue of the vibrating yoke portion 108b placed on the outer peripheral surface, and is designed not to slide together with the sliding portion $102_2$ of the movable unit 102 and the electromagnet 105 by virtue of the vibrating yoke portion 108a. In a plane perpendicular to the x-axis and at a location substantially parallel to the stationary base 103, outer peripheral portions of the vibrating yoke portion 108b are connected to the two piezoelectric elements 106, and the other end of each of the piezoelectric elements 106 is fixed onto the stationary base 103 (FIG. 9(b)).

A magnetic flux φ6 generated from the permanent magnet 109 defines a closed loop having the magnetic path extending from the permanent magnet 109 to the vibrating yoke portion 108a to the movable unit 102 to the vibrating yoke portion 108b to the permanent magnet 109. With this arrangement, a magnetic attractive force is generated between the movable unit 102 and the vibration transmitting unit 104, and pre-pressure is generated. Likewise, a magnetic flux φ7 generated from the permanent magnet 109 defines a closed loop having the magnetic path extending from the permanent magnet 109 to the vibrating yoke portion 108a to the yoke of the electromagnet 105 to the vibrating yoke portion 108b to the permanent magnet 109. With this arrangement, a magnetic attractive force is generated between the electromagnet 105 and the vibration transmitting unit 104, and pre-pressure is generated. In the permanent magnet 109 shown in FIG. 9(a), the inner peripheral surface is the N-pole, and the outer peripheral surface is the S-pole. However, the present invention is not limited to that, and the locations of the poles may be reversed.

The movable unit 102 rotates integrally with the movable element 111 of the rotary motor 107 that generates a torque about the x-axis. The rotary motor 107 may be of any known type, and is not limited to a certain type. For example, a DC motor can be used. A DC motor can easily obtain a torque by exciting a DC current, and therefore, exhibits excellent characteristics in terms of operability. The electromagnet 105 is a cylindrical electromagnet that includes a control coil 113.

When a current is applied to the control coil 113 by an electromagnet driver (not shown), a magnetic flux φ8 or a magnetic flux φ9 is generated in the electromagnet 105, depending on the direction of the current flow (see FIGS. 10 and 11). The magnetic flux φ8 shown in FIG. 10 defines a closed loop having the magnetic path extending from the electromagnet yoke to the vibrating yoke portion 108a to the movable unit 102 to the vibrating yoke portion 108b to the electromagnet yoke. The magnetic flux φ8 generates a magnetic attractive force between the movable unit 102 and the vibration transmitting unit 104, and also generates a magnetic attractive force between the electromagnet 105 and the vibration transmitting unit 104. With this arrangement, pre-pressure is applied between the respective components. Overlapping the magnetic flux φ6 and the magnetic flux φ7 of the permanent magnet 109, the magnetic flux φ8 is subjected to the following action. The pre-pressure between the sliding surfaces 102a of the movable unit 102 and the vibrational sliding surface 104a (hereinafter referred to as the fourth pre-pressure) acts in a direction in which the magnetic flux φ6 and the magnetic flux φ8 strengthen each other. Accordingly, the fourth pre-pressure is higher than the pre-pressure generated by the magnetic flux φ6 of the permanent magnet 109.

Meanwhile, the pre-pressure between the sliding surfaces 105a of the electromagnet 105 and the vibrational sliding surface 104b (hereinafter referred to as the third pre-pressure) acts in a direction in which the magnetic flux φ7 and the magnetic flux φ8 weaken (cancel) each other. Accordingly, the third pre-pressure is lower than the pre-pressure generated by the magnetic flux φ7 of the permanent magnet 109.

The magnetic flux φ9 shown in FIG. 11 is in the opposite direction from the magnetic flux φ8, and is obtained by switching the excitation current for the control coils 113 of the electromagnet 105 between positive and negative directions. The magnetic flux φ9 defines a closed loop having the magnetic path extending from the electromagnet yoke to the vibrating yoke portion 108b to the movable unit 102 to the vibrating yoke portion 108a to the electromagnet yoke. The magnetic flux φ9 generates the third pre-pressure and the fourth pre-pressure. Here, the fourth pre-pressure acts in a direction in which the magnetic flux φ6 and the magnetic flux φ9 weaken (cancel) each other, and therefore, the fourth pre-pressure is lower than the pre-pressure generated by the magnetic flux φ6 of the permanent magnet 109.

On the other hand, the third pre-pressure acts in a direction in which the magnetic flux φ7 and the magnetic flux φ9 strengthen each other, and therefore, the third pre-pressure is higher than the pre-pressure generated by the magnetic flux φ7 of the permanent magnet 109. In view of the above described facts, the third pre-pressure and the fourth pre-pressure can be actively and continuously adjusted by adjusting the excitation current for the control coils 113 of the electromagnet 105.

The operations of the drive apparatus 100 of the second embodiment are the same as those of the drive apparatus 1 of the first embodiment in terms of functions, though there is a difference in terms of the direct-acting type and the rotating type. Therefore, explanation of those operations is not repeated herein. The operations of the piezoelectric elements 106 are additionally described herein, since the method of transmitting vibrations of rotational displacement to the vibration transmitting unit 104 slightly differs from the method implemented in the drive apparatus 1. Two piezoelectric elements 106 are used as a pair. When the operating state of the piezoelectric elements 106 is a vibrating (ON) state, operating signals 16 having opposite phases from each other are input to the pair of piezoelectric elements 106. That is, an operating signal that further increases the amount of offset from a predetermined amount of offset is supplied to the piezoelectric element 106 located on the right side in FIG. 9(b), and an operating signal that decreases the amount of offset is supplied to the piezoelectric element 106 located on the left side in FIG. 9(b). With this arrangement, rotational displacement counterclockwise about the x-axis is caused in the vibration transmitting unit 104. The positive and negative directions of the operating signals are alternately switched so as to generate rotational vibrations. In this manner, the movable unit 102 is rotated and driven by a net driving force (not shown).

As described above, the second embodiment can also provide a drive apparatus that can be made smaller in size, while achieving higher speed, higher stabilizability, higher stability, and precise positioning.

First Modification

Figure 12:
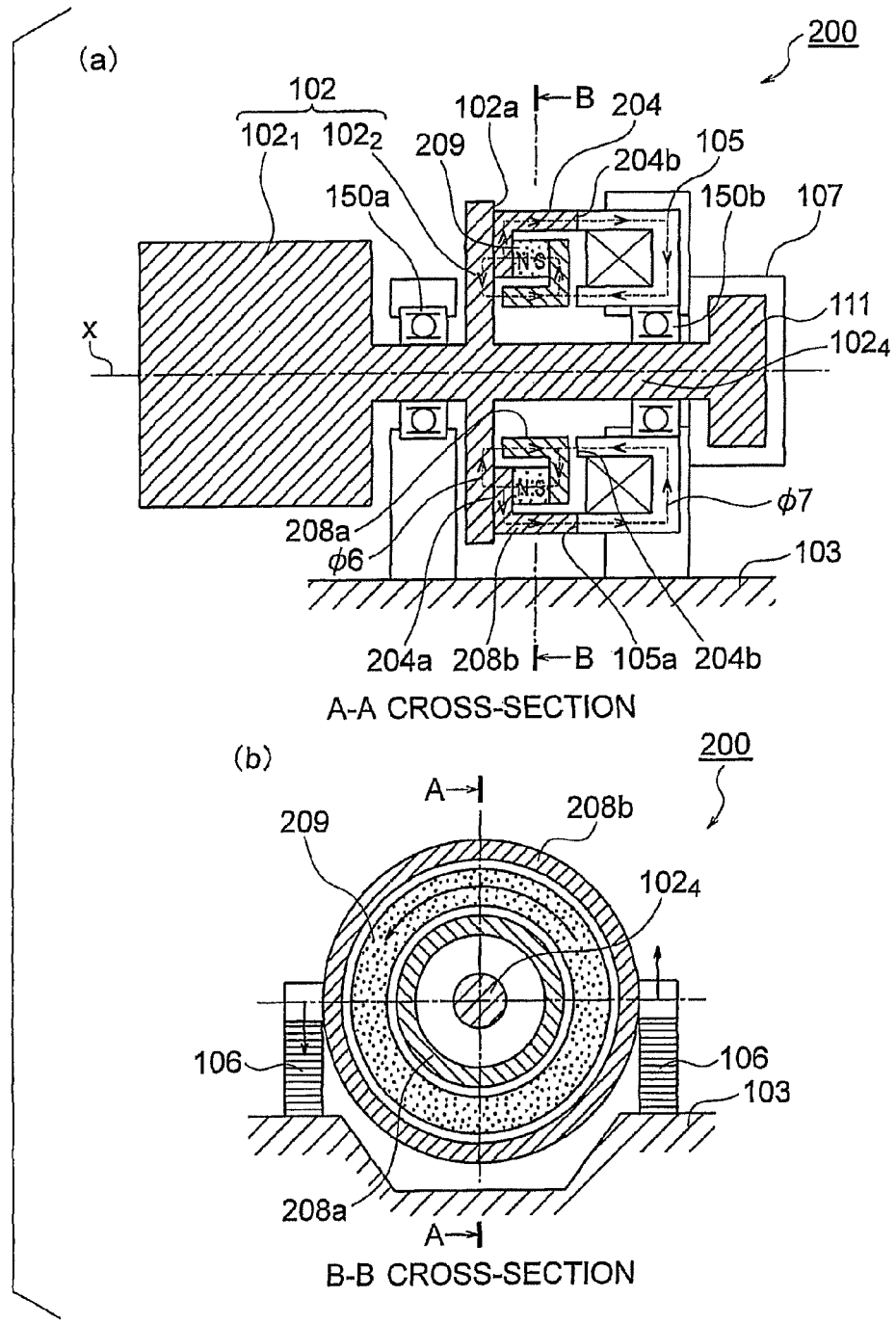
FIGS. 12(a) and 12(b) are cross-sectional views showing a drive apparatus according to a first modification of the second embodiment.

FIGS. 12(a) and 12(b) show a drive apparatus 200 according to a first modification of the second embodiment. FIG. 12(a) is a cross-sectional view of the drive apparatus 200, taken along the line A-A of FIG. 12(b). FIG. 12(b) is a cross-sectional view of the drive apparatus 200, taken along the line B-B of FIG. 12(a).

It should be noted that the different aspects from the drive apparatus 100 of the second embodiment shown in FIGS. 9(a) through 11 are described herein, and the same aspects as those of the drive apparatus 100 are not. The drive apparatus 200 includes: a movable unit 102 that rotatably moves about the x-axis; bearings 150a and 150b that are mounted on a stationary base 103 and rotatably support the movable unit 102; a ring-like vibration transmitting unit 204 that includes a vibrational sliding surface 204a that is in contact with and slides along a sliding surface 102a of the movable unit 102; an electromagnet 105 that applies pre-pressure to the movable unit 102 via the vibration transmitting unit 204; piezoelectric elements 106 that are connected to the vibration transmitting unit 204 and transmit vibrations to the vibration transmitting unit 204; and a rotary motor 107 that generates a torque for moving the movable unit 102 about the x-axis. The vibration transmitting unit 204 also includes a vibrational sliding surface 204b that is in contact with and slides along a sliding surface 105a of the electromagnet 105. The vibration transmitting unit 204 further includes: ring-like vibrating yoke portions 208a and 208b that define magnetic paths magnetically connecting the movable unit 102 and the electromagnet 105 via the vibrational sliding surfaces 204a and 204b; and a ring-like permanent magnet 209 that has the vibrating yoke portions 208a and 208b respectively placed on two end surfaces facing each other in the x-axis direction, and is magnetized in the x-axis direction. The vibrating yoke portion 208b is designed to slide together with a sliding portion $102_2$ of the movable unit 102 and the electromagnet 105, and the vibrating yoke portion 208a is designed not to slide together with the sliding portion $102_2$ of the movable unit 102 and the electromagnet 105.

The magnetic flux ϕ6 and the magnetic flux ϕ7 generated from the permanent magnet 209 define magnetic paths having different shapes from those in the drive apparatus 100. However, the magnetic flux ϕ6 and the magnetic flux ϕ7 have exactly the same functions and achieve the same effects as those in the drive apparatus 100. The magnetic flux ϕ8 and the magnetic flux ϕ9 (not shown) generated from the electromagnet 105 are adjusted through the excitation current for the control coil 113. In this manner, the third pre-pressure and the fourth pre-pressure can be actively and continuously adjusted. The permanent magnet 209 forms a ring-like structure that is magnetized in the x-axis direction. Accordingly, the costs are expected to be lower than the costs of the permanent magnet 109 that is magnetized in the radial direction in the drive apparatus 100.

Second Modification

Figure 13:
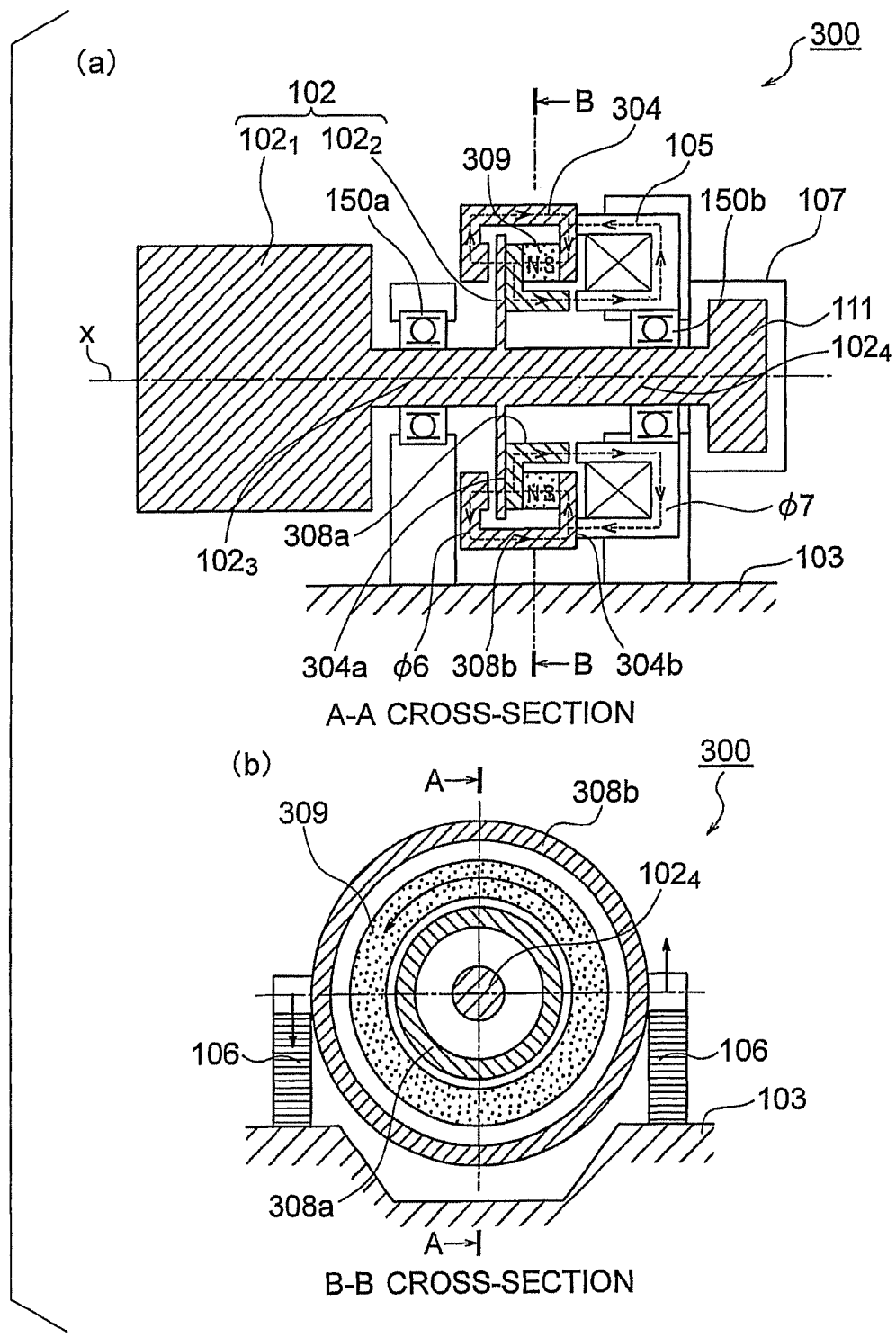
FIGS. 13(a) and 13(b) are cross-sectional views showing a drive apparatus according to a second modification of the second embodiment.

FIGS. 13(a) and 13(b) show a drive apparatus 300 according to a second modification of the second embodiment. FIG. 13(a) is a cross-sectional view of the drive apparatus 300, taken along the line A-A of FIG. 13(b). FIG. 13(b) is a cross-sectional view of the drive apparatus 300, taken along the line B-B of FIG. 13(a).

It should be noted that the different aspects from the drive apparatus 100 of the second embodiment shown in FIGS. 9(a) through 11 and the drive apparatus 200 of the first modification shown in FIGS. 12(a) and 12(b) are described herein, and the same aspects as those of the drive apparatuses 100 and 200 are not.

The drive apparatus 300 of the second modification includes: a movable unit 102 that rotatably moves about the x-axis; a ring-like vibration transmitting unit 304 that includes a vibrational sliding surface 304a that is in contact with and slides along a sliding surface 102a of the movable unit 102; an electromagnet 105 that applies pre-pressure to the movable unit 102 via the vibration transmitting unit 304; piezoelectric elements 106; and a rotary motor 107. The vibration transmitting unit 304 also includes a vibrational sliding surface 304b that is in contact with and slides along a sliding surface 105a of the electromagnet 105. The vibration transmitting unit 304 further includes: ring-like vibrating yoke portions 308a and 308b that define magnetic paths magnetically connecting the movable unit 102 and the electromagnet 105 via the vibrational sliding surfaces 304a and 304b; and a ring-like permanent magnet 309 that has the vibrating yoke portions 308a and 308b respectively placed on two end surfaces, and is magnetized in the x-axis direction. The vibrating yoke portion 308b is designed to slide together with a sliding portion $102_2$ of the movable unit 102, and the vibrating yoke portion 308a is designed to slide together with the electromagnet 105.

The magnetic flux ϕ6 and the magnetic flux ϕ7 generated from the permanent magnet 309 define magnetic paths having different shapes from those in the drive apparatus 100 of the second embodiment. However, the magnetic flux 46 and the magnetic flux ϕ7 have exactly the same functions and achieve the same effects as those in the drive apparatus 100.

The magnetic flux ϕ6 is formed in a magnetic path that extends along the x-axis and penetrates through a disk that forms the sliding surface 102a of the movable unit 102. Accordingly, the disk can be designed to have an extremely small thickness. This is because a magnetic path that penetrates the disk needs to be provided only in the x-axis direction, and the thickness of the disk is not included in the design parameters used in the design of magnetisms. Accordingly, the inertia moment of the movable unit 2 is reduced, and the response of the movable unit 2 is improved. Also, the required torque of the driving force generating unit can be made smaller, and the entire drive apparatus can be made smaller in size.

Third Modification

Figure 14:
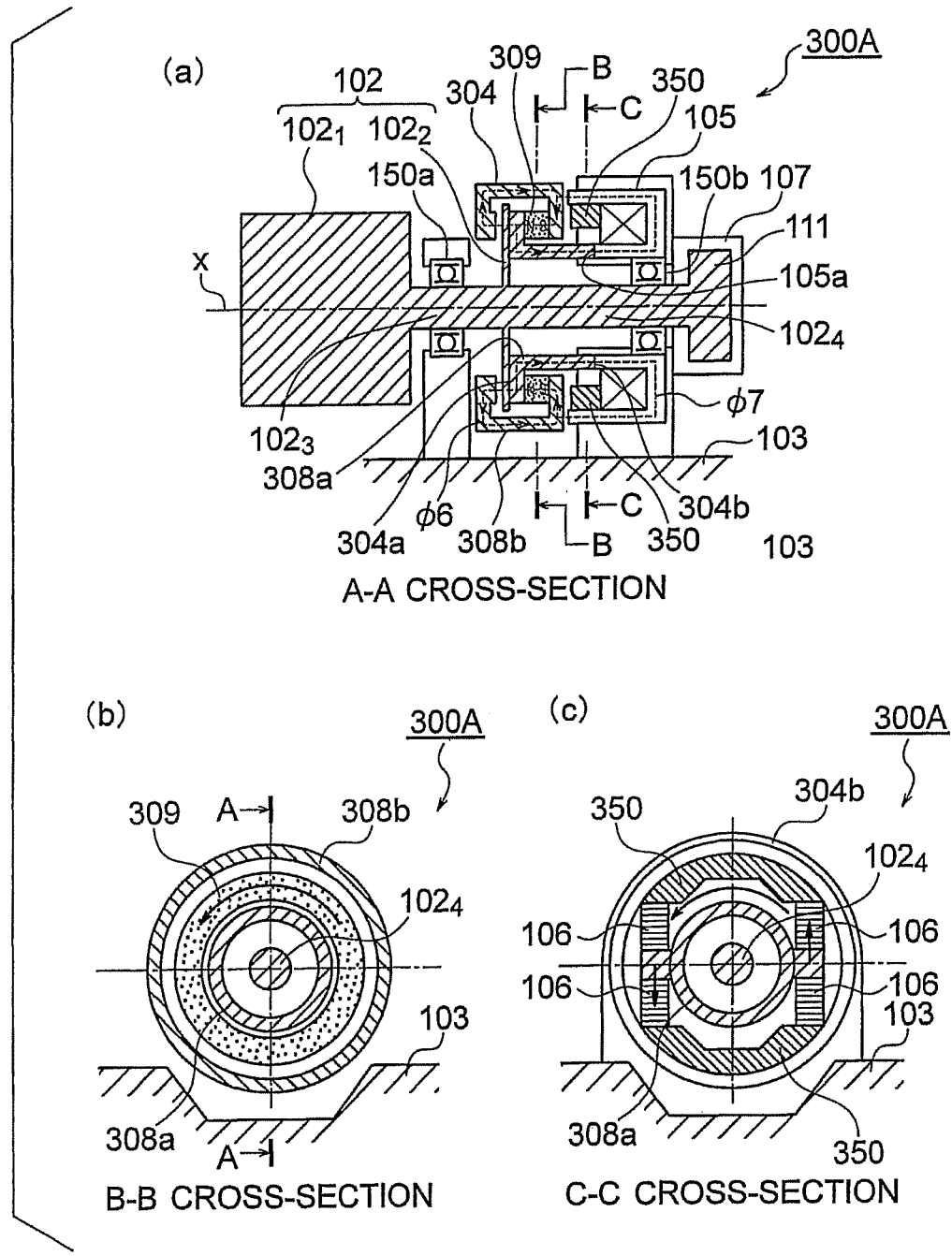
FIGS. 14(a), 14(b), and 14(c) are cross-sectional views showing a drive apparatus according to a third modification of the second embodiment.

FIGS. 14(a), 14(b), and 14(c) show a drive apparatus 300A according to a third modification of the second embodiment.

FIG. 14(a) is a cross-sectional view of the drive apparatus 300A, taken along the line A-A of FIG. 14(b). FIG. 14(b) is a cross-sectional view of the drive apparatus 300A, taken along the line B-B of FIG. 14(a). FIG. 14(c) is a cross-sectional view of the drive apparatus 300A, taken along the line C-C of FIG. 14(a).

It should be noted that the different aspects from the drive apparatus 300 of the second modification of the second embodiment are described herein, and the same aspects as those of the drive apparatus 300 are not.

The drive apparatus 300A of the third modification differs from the drive apparatus 300 of the second modification in that the piezoelectric elements 106 are connected to the vibrating yoke portion 308a formed on the inner peripheral surface, instead of the vibrating yoke portion 308b formed on the outer peripheral surface, the number of piezoelectric elements 106 is four, instead of two, and piezoelectric element supporting members 350 that are fixed to the electromagnet 105 and are connected to one end of each of the piezoelectric elements 106 are added. The four piezoelectric elements 106 are arranged on the upper and lower sides of both outer peripheral end portions of the vibrating yoke portion 308a, sandwiching the piezoelectric element supporting members 350. In this structure, push-pull driving is performed by the pairs of piezoelectric elements provided on the upper and lower sides. In this manner, the tensile stress acting on the piezoelectric elements 106 can be reduced, and damage to the piezoelectric elements 106 can be prevented.

Fourth Modification

Figure 15:
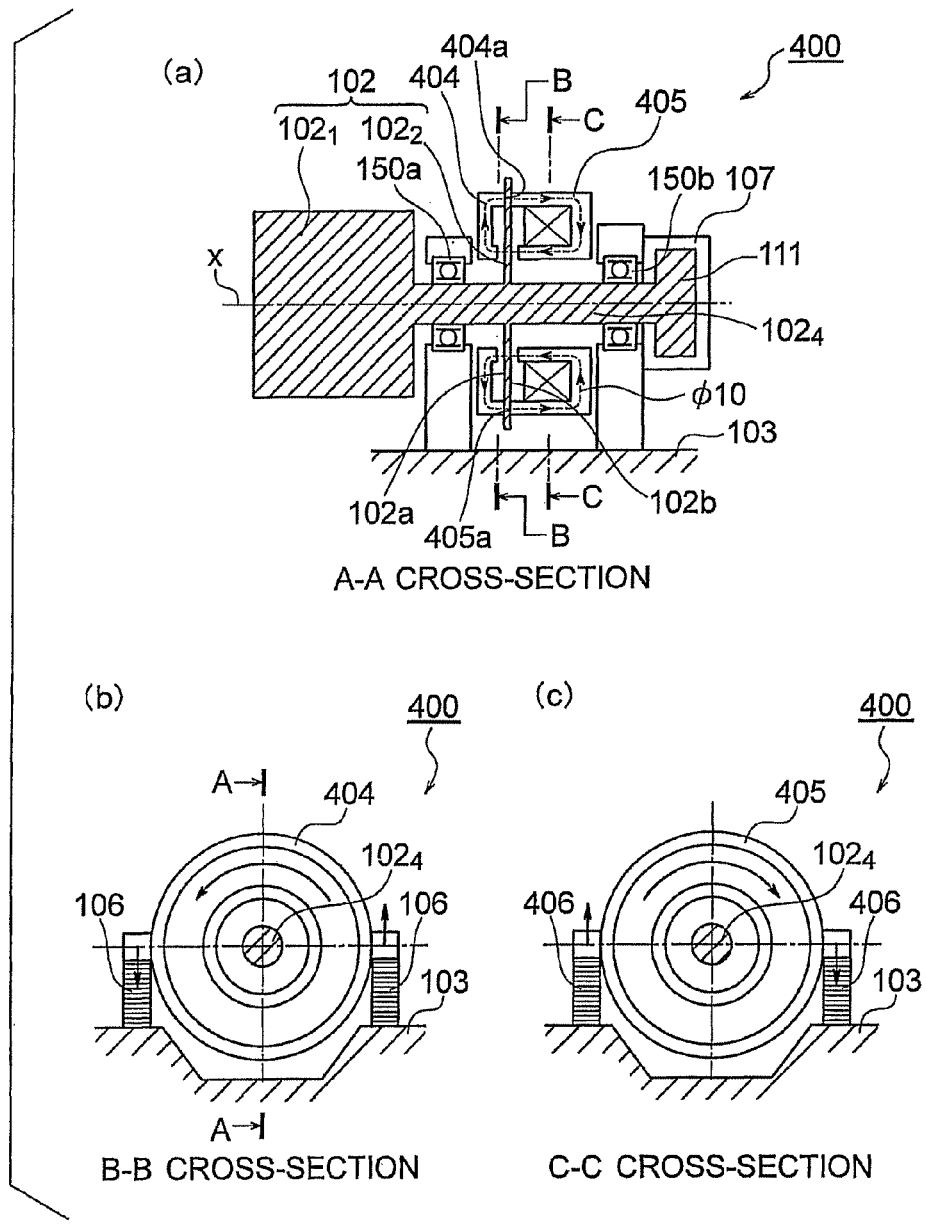
FIGS. 15(a), 15(b), and 15(c) are cross-sectional views showing a drive apparatus according to a fourth modification of the second embodiment.

FIGS. 15(a), 15(b), and 15(c) show a drive apparatus 400 according to a fourth modification of the second embodiment. FIG. 15(a) is a cross-sectional view of the drive apparatus 400, taken along the line A-A of FIG. 15(b). FIG. 15(b) is a cross-sectional view of the drive apparatus 400, taken along the line B-B of FIG. 15(a). FIG. 15(c) is a cross-sectional view of the drive apparatus 400, taken along the line C-C of FIG. 15(a).

It should be noted that the different aspects from the drive apparatuses 100, 200, and 300 of the second embodiment and the first and second modifications are described herein, and the same aspects as those of the drive apparatuses 100, 200, and 300 are not.

The drive apparatus 400 of the fourth modification includes: a movable unit 102 that rotatably moves about the x-axis; a ring-like vibration transmitting unit 404 that includes a vibrational sliding surface 404a that is in contact with and slides along a sliding surface 102a of the movable unit 102; an electromagnet 405 that includes a vibrational sliding surface 405a that is in contact with and slides along a sliding surface 102b of the movable unit 102; piezoelectric elements 106 that are connected to the vibration transmitting unit 404 and transmit vibrations to the vibration transmitting unit 404; piezoelectric elements 406 that are connected to the electromagnet 405 and transmit vibrations to the electromagnet 405; and a rotary motor 107. The electromagnet 405 generates an electromagnetic attractive force between the respective parts through a magnetic flux 10 formed with a magnetic path that extends in the x-axis direction and penetrates through the vibration transmitting unit 404 and the disk forming the sliding surfaces 102a and 102b of the movable unit 102. In this manner, the electromagnet 405 generates pre-pressure. As in the drive apparatus 300 of the second embodiment, the disk of the movable unit 102 can be designed to have an extremely small thickness. The two piezoelectric elements 106 are used as a pair. When the operating state of the piezoelectric elements 106 is a vibrating (ON) state, operating signals 16 having opposite phases from each other are input to the pair of piezoelectric elements 106. That is, an operating signal that further increases the amount of offset from a predetermined amount of offset is supplied to the piezoelectric element 106 located on the right side in FIG. 15(b), and an operating signal that decreases the amount of offset is supplied to the piezoelectric element 106 located on the left side in FIG. 15(b). With this arrangement, rotational displacement counterclockwise about the x-axis is caused in the vibration transmitting unit 404. Also, the two piezoelectric elements 406 are used as a pair. When the operating state of the piezoelectric elements 406 is a vibrating (ON) state, operating signals 16 having opposite phases from each other are input to the pair of piezoelectric elements 406. That is, an operating signal that decreases the amount of offset from a predetermined amount of offset is supplied to the piezoelectric element 406 located on the right side in FIG. 15(c), and an operating signal that further increases the amount of offset is supplied to the piezoelectric element 406 located on the left side in FIG. 15(c). With this arrangement, rotational displacement clockwise about the x-axis is caused in the electromagnet 405. The positive and negative directions of the operating signals are alternately switched so as to generate rotational vibrations in opposite directions from each other. In this manner, the movable unit 102 is rotated and driven by a net driving force (not shown).

As the piezoelectric elements 106 and 406 generate rotational vibrations in opposite directions from each other, frictions caused by generation of vibrations can be reduced, and the vibration force acting on the movable unit 102 can be cancelled. Accordingly, generation of vibrations is restrained, and the positioning action of the movable unit 102 is expected to be performed at an even higher speed.

As described above, the above embodiment can provide a drive apparatus that can be made smaller in entre size, while achieving higher speed, higher stabilizability, higher stability, and more precise positioning. That is, excellent damping characteristics can be passively achieved through frictions. Thus, stabilizability of stopping operations and stability in the stopped state are expected to increase. Also, residual vibration of the movable unit 102 can be restrained, and high-speed responses can be expected.

As described above, the drive apparatus according to the present invention is made smaller in entire size, while achieving all drive characteristics such as high speed, high settabiltiy, high stability, and precise positioning. Therefore, the drive apparatus according to the present invention can be expected to be used as a high-speed precision machine in the fields that require high-speed, high-precision positioning devices, such as the fields of measurement instruments, fabricating machines, and information processing devices, as well as various other fields.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concepts as defined by the appended claims and their equivalents.

What is claimed is:

1. A drive apparatus comprising:
   a movable unit configured to include a first sliding surface and rotatably move about an axis of rotation;
   a vibration generating unit configured to generate vibrations;

a vibration transmitting unit configured to include a second sliding surface in contact with the first sliding surface of the movable unit, and transmit the vibrations generated by the vibration generating unit to the movable unit via the first and second sliding surfaces;

a pre-pressure applying unit configured to apply pre-pressure to the movable unit via the vibration transmitting unit; and a driving force generating unit configured to generate a driving force for driving the movable unit in a predetermined direction, the driving force being greater than a friction force between the first sliding surface and the second sliding surface when the vibrations are being transmitted to the vibration transmitting unit, the driving force being smaller than the friction force when the vibrations are not being transmitted to the vibration transmitting unit, wherein the pre-pressure applying unit includes an electromagnet, a closed-loop magnetic flux generated by the electromagnet forming a magnetic path, the magnetic path magnetically connecting the pre-pressure applying unit and the vibration transmitting unit, the magnetic path magnetically connecting the vibration transmitting unit and the movable unit, the vibration transmitting unit includes a permanent magnet, a closed-loop magnetic flux generated by the permanent magnet forming a magnetic path, the magnetic path magnetically connecting the vibration transmitting unit and the pre-pressure applying unit, the magnetic path magnetically connecting the vibration transmitting unit and the movable unit, and the drive apparatus further comprises an electromagnet driver that adjusts first pre-pressure and second pre-pressure through an excitation current of the electromagnet, the first pre-pressure being generated between the vibration transmitting unit and the pre-pressure applying part, the second pre-pressure being generated between the vibration transmitting unit and the movable unit.

2. The apparatus according to claim 1, further comprising a stationary base, wherein the vibration generating unit includes a piezoelectric element that transmits the vibrations to the vibration transmitting unit, one end of the piezoelectric element being connected to the vibration transmitting unit, the other end of the piezoelectric element being connected to the stationary base.

3. A drive apparatus, comprising:

a movable unit configured to include a first sliding surface and rotatably move about an axis of rotation;

a vibration generating unit configured to generate vibrations;

a vibration transmitting unit configured to include a second sliding surface in contact with the first sliding surface of the movable unit, and transmit the vibrations generated by the vibration generating unit to the movable unit via the first and second sliding surfaces;

a pre-pressure applying unit configured to apply pre-pressure to the movable unit via the vibration transmitting unit; and a driving force generating unit configured to generate a driving force for driving the movable unit in a predetermined direction, the driving force being greater than a friction force between the first sliding surface and the second sliding surface when the vibrations are being transmitted to the vibration transmitting unit, the driving force being smaller than the friction force when the vibrations are not being transmitted to the vibration transmitting unit, wherein the movable unit includes a main body and a sliding portion that is formed integrally with the main body, the sliding portion including the first sliding surface, and the vibration transmitting unit includes a first portion that is placed on an outer peripheral side, and a second portion that is formed on an inner peripheral side integrally with the first portion, the first portion including the second sliding surface, the first portion transmitting the vibrations generated by the vibration generating unit to the movable unit via the first and second sliding surfaces.

4. A drive apparatus, comprising:

a movable unit configured to include a first sliding surface and rotatably move about an axis of rotation;

a vibration generating unit configured to generate vibrations;

a vibration transmitting unit configured to include a second sliding surface in contact with the first sliding surface of the movable unit, and transmit the vibrations generated by the vibration generating unit to the movable unit via the first and second sliding surfaces;

a pre-pressure applying unit configured to apply pre-pressure to the movable unit via the vibration transmitting unit; and a driving force generating unit configured to generate a driving force for driving the movable unit in a predetermined direction, the driving force being greater than a friction force between the first sliding surface and the second sliding surface when the vibrations are being transmitted to the vibration transmitting unit, the driving force being smaller than the friction force when the vibrations are not being transmitted to the vibration transmitting unit, wherein the movable unit includes a main body and a sliding portion that is formed integrally with the main body, the sliding portion including the first sliding surface, and the vibration transmitting unit includes a first portion that is placed on an outer peripheral side, and a second portion that is formed on an inner peripheral side integrally with the first portion, the first portion receiving the vibrations generated by the vibration generating unit, the second portion including the second sliding surface, the second portion transmitting the vibrations to the movable unit via the first and second sliding surfaces.

5. A drive apparatus, comprising:

a movable unit configured to include a first sliding surface and rotatably move about an axis of rotation;

a vibration generating unit configured to generate vibrations;

a vibration transmitting unit configured to include a second sliding surface in contact with the first sliding surface of the movable unit, and transmit the vibrations generated by the vibration generating unit to the movable unit via the first and second sliding surfaces;

a pre-pressure applying unit configured to apply pre-pressure to the movable unit via the vibration transmitting unit; and a driving force generating unit configured to generate a driving force for driving, the movable unit in a predetermined direction, the driving force being greater than a friction force between the first sliding surface and the second sliding surface when the vibrations are being transmitted to the vibration transmitting unit, the driving force being smaller than the friction force when the vibrations are not being transmitted to the vibration transmitting unit, wherein the movable unit includes a main body and a sliding portion that is formed integrally with the main body, the sliding portion including the first sliding surface, and the vibration transmitting unit includes a first portion that is placed on an outer peripheral side, and a second portion that is formed on an inner peripheral side integrally with the first portion, the second portion including the second sliding surface, the second portion transmitting the vibrations generated by the vibration generating unit to the movable unit via the first and second sliding surfaces.

6. A drive apparatus comprising:

a movable unit configured to include first and second sliding surfaces, and rotatably move about an axis of rotation;

first and second vibration generating units configured to generate vibrations;

a vibration transmitting unit configured to include third and fourth sliding surfaces in contact with the first and second sliding surfaces of the movable unit, respectively, the vibration transmitting unit transmitting the vibrations generated by the first vibration generating unit to the movable unit via the first and third sliding surfaces, the vibration transmitting unit transmitting the vibrations generated by the second vibration generating unit to the movable unit via the second and fourth sliding surfaces;

a pre-pressure applying unit configured to apply pre-pressure to the movable unit via the vibration transmitting unit; and a driving force generating unit configured to generate a driving force for driving the movable unit in a predetermined direction, the driving force being greater than a friction force between the first sliding surface and the third sliding surface and a friction force between the second sliding surface and the fourth sliding surface when the vibrations are being transmitted to the vibration transmitting unit, the driving force being smaller than the friction forces when the vibrations are not being transmitted to the vibration transmitting unit.

7. The apparatus according to claim 6, further comprising a stationary base, wherein the first vibration generating unit and the second vibration generating unit each includes a piezoelectric element that transmits the vibrations to the vibration transmitting unit, one end of the piezoelectric element being connected to the vibration transmitting unit, the other end of the piezoelectric element being connected to the stationary base.

8. The apparatus according to claim 3, further comprising a stationary base, wherein the vibration generating unit includes a piezoelectric element that transmits the vibrations to the vibration transmitting unit, one end of the piezoelectric element being connected to the vibration transmitting unit, the other end of the piezoelectric element being connected to the stationary base.

9. The apparatus according to claim 4, further comprising a stationary base, wherein the vibration generating unit includes a piezoelectric element that transmits the vibrations to the vibration transmitting unit, one end of the piezoelectric element being connected to the vibration transmitting unit, the other end of the piezoelectric element being connected to the stationary base.

10. The apparatus according to claim 5, further comprising a stationary base, wherein the vibration generating unit includes a piezoelectric element that transmits the vibrations to the vibration transmitting unit, one end of the piezoelectric element being connected to the vibration transmitting unit, the other end of the piezoelectric element being connected to the stationary base.

* * * * *